(12) United States Patent
Sasaki

(10) Patent No.: US 10,945,506 B2
(45) Date of Patent: Mar. 16, 2021

(54) CONTOUR DETECTION APPARATUS, DRAWING APPARATUS, CONTOUR DETECTION METHOD, AND STORAGE MEDIUM

(71) Applicant: CASIO COMPUTER CO., LTD., Tokyo (JP)

(72) Inventor: Masaaki Sasaki, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 118 days.

(21) Appl. No.: 16/224,668

(22) Filed: Dec. 18, 2018

(65) Prior Publication Data

US 2019/0191845 A1  Jun. 27, 2019

(30) Foreign Application Priority Data

Dec. 22, 2017 (JP) .............................. JP2017-245689

(51) Int. Cl.
*A45D 29/14* (2006.01)
*G06T 7/13* (2017.01)
(Continued)

(52) U.S. Cl.
CPC ............. *A45D 29/00* (2013.01); *A45D 29/14* (2013.01); *A45D 44/005* (2013.01); *G06T 7/13* (2017.01);
(Continued)

(58) Field of Classification Search
CPC ...... A45D 29/14; A45D 29/00; A45D 44/005; A45D 2029/005; A45D 2044/007;
(Continued)

(56) References Cited

U.S. PATENT DOCUMENTS

| | | | | |
|---|---|---|---|---|
| 5,982,912 | A * | 11/1999 | Fukui | G06K 9/00221 382/115 |
| 2005/0265604 | A1* | 12/2005 | Yuasa | G06K 9/00597 382/199 |
| 2014/0185924 | A1* | 7/2014 | Cao | G06K 9/6209 382/159 |
| 2017/0154214 | A1* | 6/2017 | Freeman | G06K 9/621 |

(Continued)

OTHER PUBLICATIONS

Cootes et al, "Active Appearance Models" ECCV, 2:484-498, 1998 (Year: 1998).*

(Continued)

*Primary Examiner* — Huan H Tran
(74) *Attorney, Agent, or Firm* — Holtz, Holtz & Volek PC

(57) ABSTRACT

A contour detection apparatus includes a processor. The processor learns to detect a nail contour being a detection target by setting an initial shape including feature points based on learning data each being image data on a finger including a learning target nail, and setting, as a reference point, a feature point among the feature points corresponding to a reference position, thereby obtaining contour detection information. The processor arranges, in treatment target data being image data on a finger including a treatment target nail, an initial position of the shape such that a point corresponding to the reference position in a contour of the finger including the treatment target nail is superposed on the reference point, and fits the shape to the treatment target nail from the initial position, thereby detecting the nail contour of the treatment target nail.

16 Claims, 9 Drawing Sheets

(51) Int. Cl.
*A45D 29/00* (2006.01)
*G06T 7/73* (2017.01)
*A45D 44/00* (2006.01)
*G06T 7/194* (2017.01)
*B41J 11/00* (2006.01)
*B41J 3/407* (2006.01)

(52) U.S. Cl.
CPC .......... *G06T 7/73* (2017.01); *A45D 2029/005* (2013.01); *A45D 2044/007* (2013.01); *B41J 3/407* (2013.01); *B41J 11/008* (2013.01); *G06T 7/194* (2017.01); *G06T 2207/20081* (2013.01); *G06T 2207/30196* (2013.01)

(58) Field of Classification Search
CPC ... G06T 7/73; G06T 7/13; G06T 2207/30196; G06T 7/194; G06T 2207/20081; G06T 7/149; G06T 7/12; G06T 2207/20224; B41J 3/4073; B41J 3/407; B41J 11/008
See application file for complete search history.

(56) References Cited

U.S. PATENT DOCUMENTS

2018/0165855 A1* 6/2018 Cheng ................ G06T 7/11
2019/0084331 A1* 3/2019 Kasahara .............. G06T 7/62
2019/0095747 A1* 3/2019 Sasaki ................ G06T 7/136

OTHER PUBLICATIONS

Cootes et al, "Training Models of Shape from Sets of Examples", BMVC'92, pp. 266-275, 1992 (Year: 1992).*
Cootes et al "Active Appearance Models", IEEE Transactions on Pattern Analysis and Machine Intelligence, vol. 23, No. 6, Jun. 2001 (Year: 2001).*
Wei-Jong Yang et al "Multi-feature shape regression for face alignment", . EURASIP Journal on Advances in Signal Processing (2018) 2018:51 https://doi.org/10.1186/s13634-018-0572-6 (Year: 2018).*
Xudong Cao, et al., "Face Alignment by Explicit Shape Regression," CVPR 2012, pp. 2887-2897.

* cited by examiner

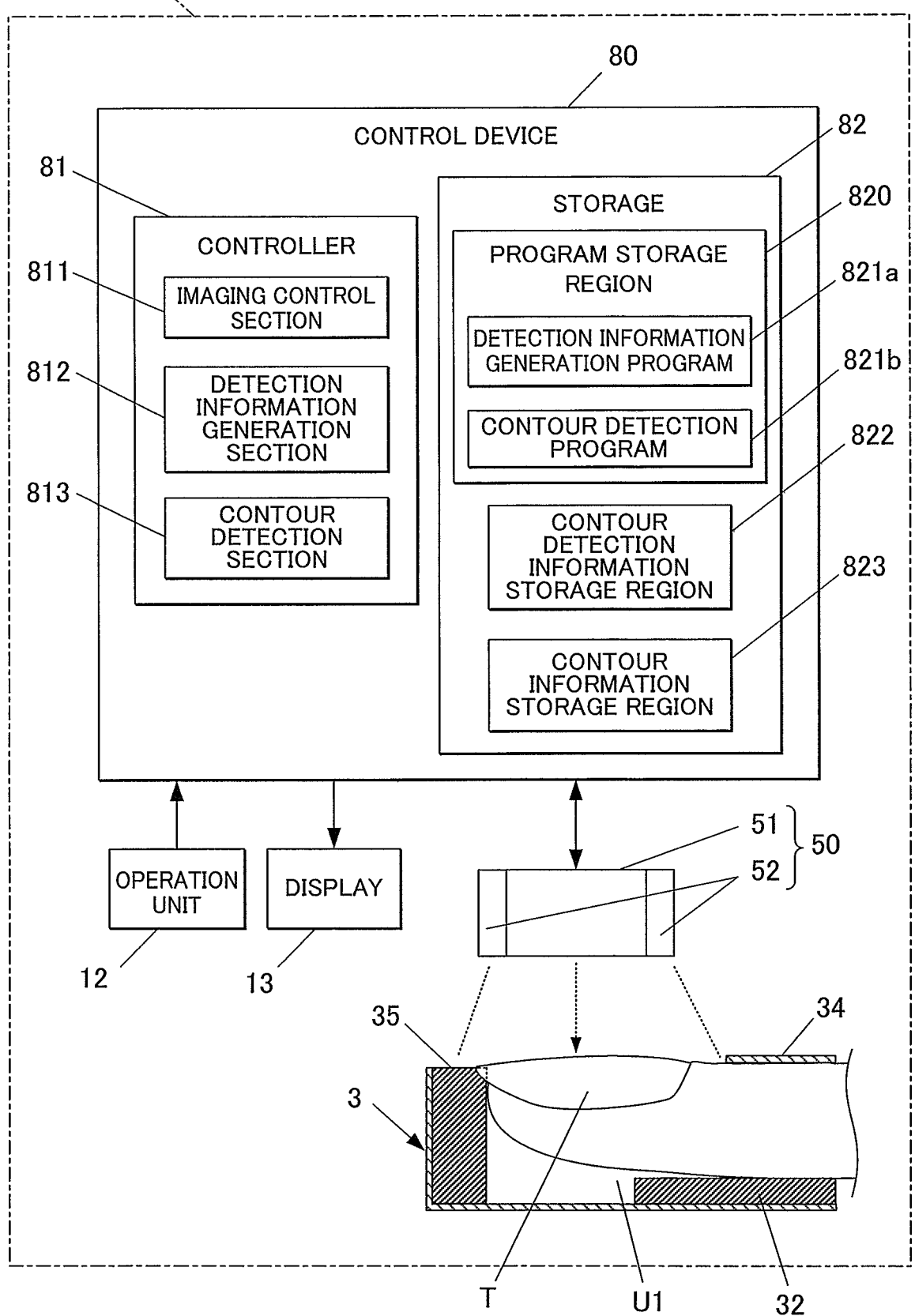

CONTOUR DETECTION APPARATUS, DRAWING APPARATUS, CONTOUR DETECTION METHOD, AND STORAGE MEDIUM

CROSS-REFERENCE TO RELATED APPLICATIONS

This application is based upon and claims the benefit of priority under 35 U.S.C. 119 of Japanese Patent Application No. 2017-245689 filed on Dec. 22, 2017 the entire disclosure of which, including the description, claims, drawings, and abstract, is incorporated herein by reference in its entirety.

BACKGROUND OF THE INVENTION

1. Field of the Invention

The present invention relates to a contour detection apparatus, a drawing apparatus, a contour detection method, and a storage medium.

2. Description of the Related Art

As a contour detection technology, there is a method of collecting a plurality of samples for learning, learning from the samples, generating learning data as a learning result, and detecting a contour (s) by using the learning data.

Examples of the method which has been used for contour detection include active appearance model (AAM) and active shape model (ASM). These methods express arrangement of feature points of the contour of a face or a facial part in model called shape model, and fit the shape model to an image including a detection target, thereby detecting the contour of the detection target.

In "Face Alignment by Explicit Shape Regression" by Xudong Cao, Yichen Wei, Fang Wen, and Jian Sun, CVPR 2012: 2887-2897 (hereinafter called non-patent document), there is disclosed a contour detection technology of detecting the contour of a detection target by an algorism called explicit shape regression (ESR).

ESR, too, generates a shape model (initial shape) of feature points arranged around a centroid, and fits the shape model to an image including a detection target. At the time, as described in the non-patent document, ESR uses a two-levels weak regressor (weak classifier) in combination to perform contour detection as a regression problem that the shape model (initial shape) is gradually converged to the contour of the detection target, the contour being a right position.

However, in the case of detection of the contour of a nail, because, in the region of the detection target, there is no part (easily detectable part) which is quite different from its surroundings in brightness or color and serves as a landmark, and the contour part is the border between a finger and a nail, which are little different from one another in brightness or color, it is difficult to determine the position (initial position) where a shape model (initial model) should be arranged.

The present invention has been conceived in view of the above circumstances, and objects of the present invention include providing a contour detection apparatus, a drawing apparatus, a contour detection method, and a storage medium which can arrange an initial shape at an appropriate position even if imaging environments at the time of the learning and at the time of the detection are different from one another.

SUMMARY OF THE INVENTION

According to an embodiment of the present invention, there is provided a contour detection apparatus including a processor which: learns to detect a nail contour which is a detection target by setting an initial shape including a plurality of feature points based on a plurality of learning data each of which is image data on a finger including a learning target nail, and setting, as a reference point, a feature point among the feature points corresponding to a reference position, thereby obtaining contour detection information; and arranges, in treatment target data which is image data on a finger including a treatment target nail, an initial position of the initial shape such that a point corresponding to the reference position in a finger contour of the finger including the treatment target nail is superposed on the reference point, and fits the initial shape to the treatment target nail from the initial position, thereby detecting the nail contour of the treatment target nail.

According to another embodiment of the present invention, there is provided a contour detection method including: a detection information generation step of learning to detect a nail contour which is a detection target, using a plurality of learning data each of which is image data on a finger including a learning target nail, thereby obtaining contour detection information; and a contour detection step of applying the obtained contour detection information to treatment target data which is image data on a finger including a treatment target nail, thereby detecting the nail contour of the treatment target nail which is the detection target, wherein the detection information generation step includes setting an initial shape including a plurality of feature points based on the plurality of the learning data, and setting, as a reference point, a feature point among the feature points corresponding to a reference position, and the contour detection step includes arranging an initial position of the initial shape such that a point corresponding to the reference position in a finger contour of the finger including the treatment target nail is superposed on the reference point, and fitting the initial shape to the treatment target nail from the initial position, thereby detecting the nail contour of the treatment target nail.

According to another embodiment of the present invention, there is provided a non-transitory computer readable storage medium storing a program to cause a computer of a contour detection apparatus to perform: a detection information generation function which learns to detect a nail contour which is a detection target, using a plurality of learning data each of which is image data on a finger including a learning target nail, thereby obtaining contour detection information; and a contour detection function which applies the obtained contour detection information to treatment target data which is image data on a finger including a treatment target nail, thereby detecting the nail contour of the treatment target nail which is the detection target, wherein the detection information generation function sets an initial shape including a plurality of feature points based on the plurality of the learning data, and sets, as a reference point, a feature point among the feature points corresponding to a reference position, and the contour detection function arranges an initial position of the initial shape such that a point corresponding to the reference position in a finger contour of the finger including the treatment target nail is superposed on the reference point, and fits the initial shape to the treatment target nail from the initial position, thereby detecting the nail contour of the treatment target nail.

BRIEF DESCRIPTION OF THE SEVERAL VIEWS OF DRAWING

The accompanying drawings, which are incorporated in and constitute a part of the specification, illustrate embodiments of the invention, and together with the general description given above and the detailed description of the embodiments given below, serve to explain the principles of the invention, wherein:

FIG. 2 is a diagram schematically showing functional configuration of the contour detection apparatus according to the embodiment;

DETAILED DESCRIPTION OF THE INVENTION

First Embodiment

A first embodiment of a contour detection apparatus of the present invention will be described with reference to FIG. 1 to FIG. 12.

In the following embodiment (s), a detection target the contour of which is detected is a finger nail as an example.

Hereinafter, various limitations technically preferable for carrying out the present invention are provided. However, the scope of the present invention is not limited to the embodiments below or illustrated examples.

Figure 1:
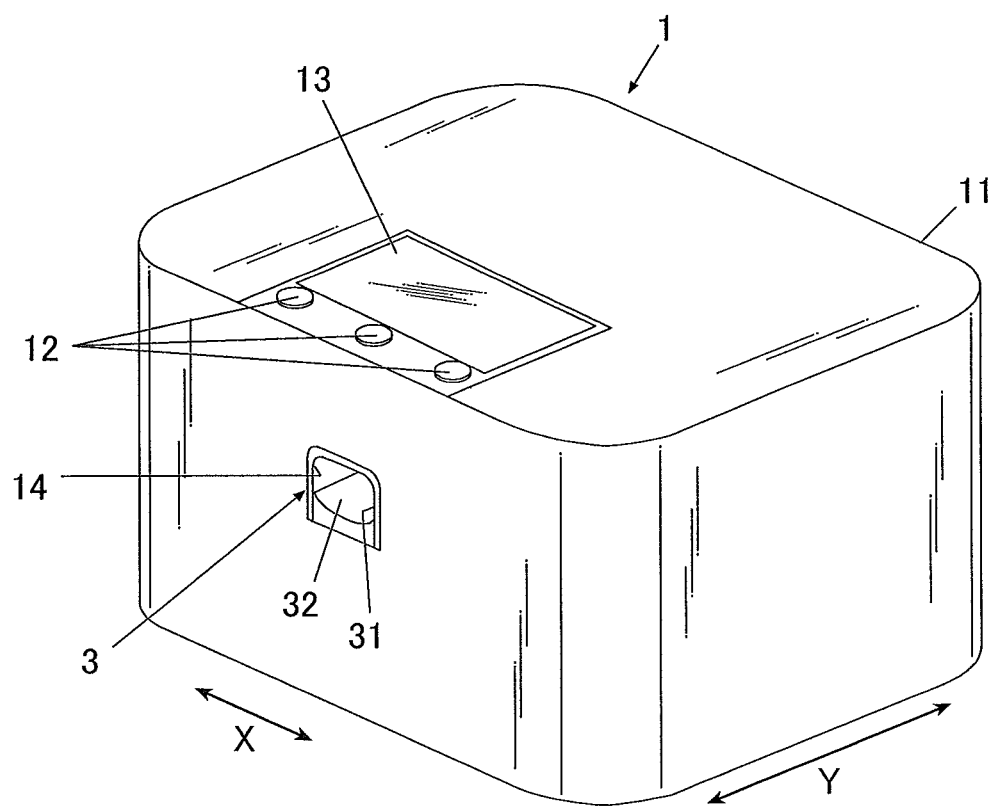
FIG. 1 is a perspective view showing external appearance of a contour detection apparatus according to an embodiment (s)

FIG. 1 is a perspective view showing external appearance of a contour detection apparatus according to this embodiment.

As shown in FIG. 1, a contour detection apparatus 1 of this embodiment has a case 11 which is formed to be approximately box-shaped.

On the upper surface (top) of the case 11, an operation unit 12 is installed.

The operation unit 12 is an input unit for a user to make various inputs.

On the operation unit 12, operation buttons to make various inputs are arranged. Examples of the operation buttons include a power switch/button to turn on the power of the contour detection apparatus 1, a stop switch/button to stop operation of the contour detection apparatus 1, and a detection start button to make an instruction to start detecting the contour of a nail T.

In this embodiment, it is assumed to perform imaging and contour detection on, as a nail region (s) which is the detection target, a user's nail (s) T that is a treatment target (s) (which may be referred to as "treatment target nail (s) ST"), and many and unspecified nails T that are learning targets to learn therefrom about contour detection (which may be referred to as "learning target nails GT"). Hereinafter, simply written "nail (s) T" indicates both the treatment target nail (s) ST and the learning target nail (s) GT.

Further, a finger corresponding to the treatment target nail ST (i.e. user's finger) is referred to as "finger U1", and many and unspecified fingers corresponding to the learning target nails GT are referred to as "fingers U2".

On the upper surface (top) of the case 11, a display 13 is also installed.

The display 13 is constituted of, for example, a liquid crystal display (LCD), an organic electroluminescence display, or another flat display.

In this embodiment, the display 13 displays, as needed, images, such as a finger image (finger image including an image of the nail ST) obtained by imaging the finger U1 and an image of the nail contour of the nail ST (nail contour Ts of the treatment target nail ST) included in the finger image, an instruction screen which displays various instructions, and so forth.

A touchscreen for making various inputs may be integrated with the surface of the display 13. In this case, the touchscreen functions as the operation unit 12.

In the front surface (front side in FIG. 1) of the case 11, an opening part 14 is formed. The opening part 14 is where, at the time of imaging with the contour detection apparatus 1, the finger U1 corresponding to the treatment target nail ST is inserted, and the finger U1 and the nail ST are set at an imaging available position with an imaging unit 50.

In the opening part 14, a finger holder 3 is arranged. The finger holder 3 holds and fixes the treatment target nail ST (the finger U1 including the treatment target nail ST), which is the treatment target in this embodiment.

As described below, in this embodiment, the contour detection apparatus 1 also images the learning target nail (s) GT. When the contour detection apparatus 1 images the learning target nail GT, the learning target nail GT and the finger U2 corresponding thereto are set on the finger holder 3 arranged in the opening part 14.

FIG. 2 is a diagram schematically showing functional configuration of the contour detection apparatus 1 according to this embodiment.

As shown in FIG. 2, the finger holder 3 is a box-shaped member having an opening part 31 on the front side of the apparatus 1. In the finger holder 3, a finger holding member 32 which holds and fixes the finger U1 (or finger U2) is arranged.

The finger holding member 32 pushes and supports the finger U1 (or finger U2) from underneath, and is formed of, for example, flexible resin.

The back (or deep) side of the upper surface of the finger holder 3 is opened, and the nail T of the finger U1 (or finger U2) inserted into the finger holder 3 is exposed from the opening.

The front side of the upper surface of the finger holder 3 forms a finger push part 34 which prevents the finger U1 (or finger U2) from floating (rising) and limits the position of the finger U1 (or finger U2) in the up direction. The finger U1 (or finger U2) and its nail T are supported by the finger holding member 32 from underneath and pushed by the finger push part 34 from above, so that the finger U1 (or finger U2) is positioned at a predetermined position in the height direction.

In this embodiment, a nail placement part 35 where the nail T is placed is arranged deep in a finger inserting direction in which the finger U1 (or finger U2) is inserted (i.e. arranged on the back side of the finger holder 3).

Placing the tip of the nail T on the nail placement part 35 determines the position of the nail T in the horizontal direction (i.e. X direction and Y direction), and also determines the position thereof in the height direction.

The imaging unit 50 is arranged in the case 11 above the position where the treatment target nail ST (or learning target nail GT) is arranged when the finger U1 (or finger U2) is inserted into the finger holder 3.

The imaging unit 50 includes an imaging device 51 and an illuminating device 52.

The imaging device 51 is, for example, a small-sized camera which has about two million pixels or more and includes a state image sensor and a lens(es).

The illuminating device 52 is an illuminating lamp, such as a white LED. In this embodiment, a plurality of illuminating devices 52 is arranged so as to surround the imaging device 51.

Positions of the imaging device 51 and the illuminating devices 52 are not limited to those shown in the drawings. For example, the imaging device 51 and the illuminating devices 52 of the imaging unit 50 may be fixedly arranged above the nail T. Alternatively, if the imaging unit 50 is configured to be moved by a moving unit, the imaging unit 50 may be configured to be moved to above the nail T.

The imaging unit 50 is an imaging unit which images the user's nail T, which is the treatment target, thereby obtaining image data on the finger (finger U1) including the nail T (treatment target nail ST) (data of a finger image It shown in FIG. 7, etc.) as treatment target data. In this embodiment, the imaging unit 50 images the nail T positioned by the nail placement part 35.

The contour detection apparatus 1 of this embodiment needs to obtain a plurality of learning data which are used by a detection information generation section 812, described below, to generate contour detection information. The learning data are data on images Ig of the fingers U2 including the learning target nails GT (image shown in FIG. 3A, for example). In this embodiment, the imaging unit 50 also performs imaging to obtain the images Ig of the fingers U2 including the learning target nails GT.

It is unessential that the imaging unit 50 performs imaging to obtain the images Ig of the fingers U2 including the learning target nails GT.

The contour detection apparatus 1 can employ any method for obtaining the images Ig of the fingers U2 including the learning target nails GT (data of the images Ig or learning data). For example, the contour detection apparatus 1 may obtain the images Ig of the fingers U2 including the learning target nails GT imaged by an imaging unit of an apparatus apart from the contour detection apparatus 1, the imaging unit being similar to the imaging unit 50. Alternatively, if the contour detection apparatus 1 is connectable to a network, the apparatus 1 may obtain images of nails T stored in a server apparatus or the like on the network as the data of the images Ig of the fingers U2 including the learning target nails GT (learning data).

If the data of the image It of the finger U1 including the treatment target nail ST (treatment target data) and the data of the images Ig of the fingers U2 including the learning target nails GT (learning data) are obtained by the imaging unit 50 (or a like imaging unit), it is preferable that they are obtained by imaging under the most similar imaging conditions if not the same. In particular, it is preferable that conditions of illumination at the time of imaging, such as the angle of irradiation of light emitted from the illuminating devices 52, remain as similar as possible if not the same because they affect, for example, brightness of light reflected by the surface of the nail T.

Figure 3A:
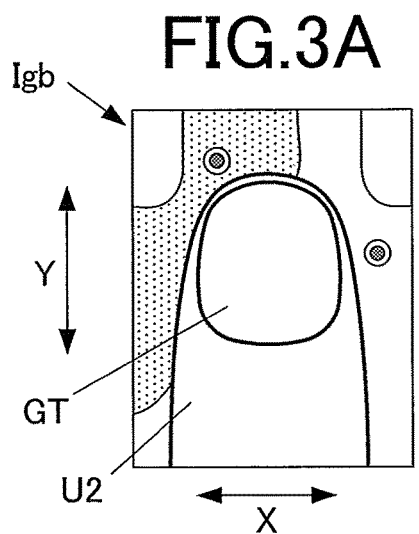
FIG. 3A shows an example of an image of a finger including a learning target nail.
Figure 3B:
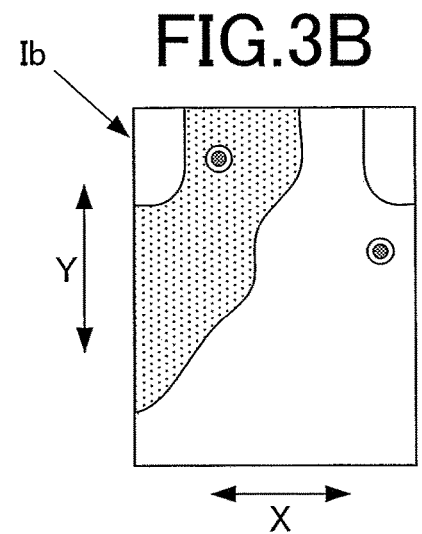
FIG. 3B shows an example of a background image showing only background in the image shown in FIG. 3A.

In this embodiment, the imaging unit 50 first images background only without the finger U1 (or finger U2), thereby obtaining data of a background image Ib (image of the finger holder 3 where the finger U1 (or finger U2) is not placed, imaged from above, as shown in FIG. 3B, for example).

If a background image(s) is stored, for example, in a storage 82, described below, of the contour detection apparatus 1, it is unnecessary to image the background only to obtain the data of the background image Ib.

As described below, in this embodiment, when the detection information generation section 812 generates the contour detection information and when a contour detection section 813 generates the nail contour Ts or a finger contour Us, they each generate a difference image(s) (no-background image(s)) by subtracting the background image Ib from an image of the finger U2 or the finger U1 imaged together with the background (image Igb shown in FIG. 3A, for example), and take this difference image (no-background image) as the learning data (image(s) Ig shown in FIG. 4) or the treatment target data (image It shown in FIG. 7).

The method for generating the no-background image of the finger contour without the background is not limited to the method of subtracting the background image Ib from the image of the finger U1 (or finger U2) imaged together with the background (image Igb shown in FIG. 3A, for example). For example, a mask image may be generated by masking the background part while not masking the finger contour, or at the time of imaging, the finger U1 (or finger U2) may be imaged on the background in solid color which is easily distinguishable from the color of the finger U1 (or finger U2), such as a black stand or a blue tarpaulin.

Figure 7:
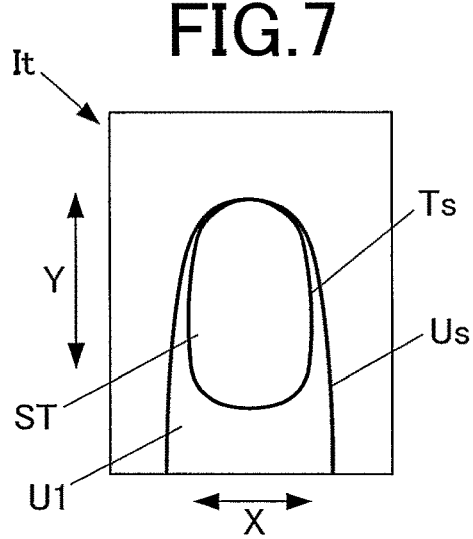
FIG. 7 shows an example of an image of a finger including a treatment target nail.

It is unnecessary to generate the no-background images as both the learning data (images Ig shown in FIG. 4) and the treatment target data (image It shown in FIG. 7). For example, the no-background images may be generated as the learning data (images Ig shown in FIG. 4) only, and the detection information generation section 812, described below, may use the learning data, which are the no-background images (images Ig shown in FIG. 4), for learning.

The imaging unit 50 is connected to and controlled by an imaging control section 811 of a control device 80 described below. The image data of the images obtained by the imaging unit 50 may be stored in the below-described storage 82 or the like.

As shown in FIG. 2, the contour detection apparatus 1 of this embodiment includes the control device 80.

The control device 80 is installed on a not-shown circuit board or the like arranged under the upper surface of the case 11, for example.

The control device 80 is a computer including: a controller 81 which is a processor constituted of a not-shown central processing unit (CPU); and the storage 82 constituted of a not-shown read only memory (ROM) and a not-shown random access memory (RAM), for example.

The storage 82 has a program storage region 820 where various programs and so forth for causing the contour detection apparatus 1 to operate are stored.

In this embodiment, in the program storage region 820, there are stored, for example, a detection information generation program 821a for generating the contour detection information, and a contour detection program 821b for detecting the nail contour Ts of the treatment target nail ST, which is the treatment target.

In this embodiment, the storage 82 also has a contour detection information storage region 822 where the contour detection information generated by the detection information generation section 812 is stored, and a contour information storage region 823 where contour information on the contour of the nail (s) T detected by the contour detection section 813 is stored.

The controller 81 as the processor in this embodiment functionally includes the imaging control section 811, the detection information generation section 812 and the contour detection section 813. Functions as the imaging control section 811, the detection information generation section 812, the contour detection section 813 and so forth are realized by the CPU of the controller 81 in cooperation with the programs stored in the program storage region 820 of the storage 82.

The imaging control section 811 controls the imaging device 51 and the illuminating devices 52 of the imaging unit 50 to cause the imaging device 51 to image the finger U1 including the treatment target nail ST, thereby obtaining the data of the image It of the finger U1 as the treatment target data. In this embodiment, the imaging control section 811 also causes the imaging unit 50 to image the fingers U2 including the learning target nails GT, thereby obtaining the data of the images Ig of the fingers U2 as the learning data.

The detection information generation section 812 learns using the plurality of the learning data, which are the data of the images Ig of the fingers U2 including the learning target nails GT (shown in FIG. 4, for example), by detecting nail contours Trs, which are the detection targets, thereby obtaining the contour detection information.

In this embodiment, the contour detection information is information obtained by learning in advance, and includes coordinate values of feature points Trp constituting an initial shape MTs (nail contour Trs) as a shape model, a regressor (classifier) constituted of a displacement amount function (regression function), and other various parameters. The contour detection information generated by the detection information generation section 812 is stored in the contour detection information storage region 822 of the storage 82.

Hereinafter, learning by the detection information generation section 812 to generate the contour detection information will be described.

In this embodiment, learning is machine learning, such as supervised learning exemplified by support vector machine (SVM).

Figure 4:
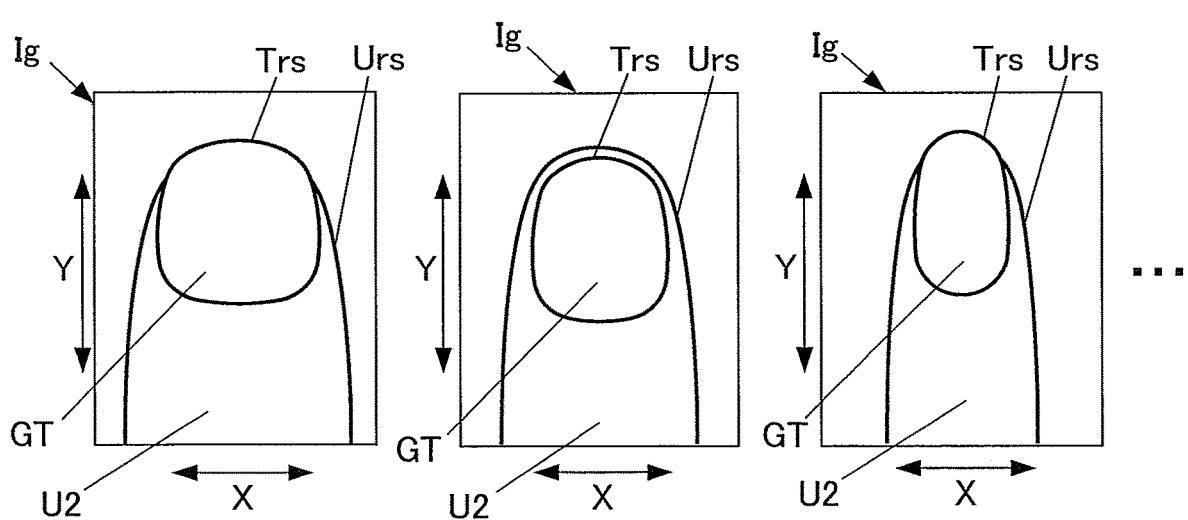
FIG. 4 shows examples of a right nail contour and a right finger contour in learning data.

Supervised learning first obtains right information relevant to detection from each of images of all learning data (images Ig shown in FIG. 4, for example).

In this embodiment, the detection information generation section 812 obtains in advance, from each learning data, a right finger contour Urs and a right nail contour Trs as the right information. The right finger contour Urs is constituted of feature points Urp and defines the region of the finger U2. The right nail contour Trs is constituted of feature points Trp and defines the region of the learning target nail GT, which is the detection target.

The method for obtaining the right finger contours Urs and the right nail contours Trs is not particularly limited. For example, the display 13 displays an image(s) (image(s) Ig shown in FIG. 4, for example) based on the learning data, and while looking at the image, the user traces with an input pen or the like and thereby specifies and inputs parts which look like the finger contour Urs and the nail contour Trs. Thus, the control device 80 obtains the input information.

Figure 6:
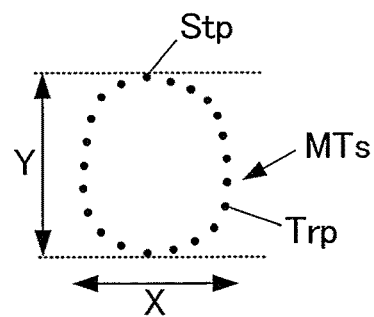
FIG. 6 shows an example of an initial shape.

The detection information generation section 812 extracts model data from the plurality of the learning data, and sets the right nail contour Trs in the model data as the initial shape MTs as shown in FIG. 6. The method for extracting the model data is not limited to but includes a method of randomly selecting one data from the plurality of the learning data, and a method of calculating the average value of all or some of the plurality of the learning data as the model data.

The detection information generation section 812 determines an initial position of the initial shape MTs by setting one of the feature points Trp constituting the initial shape MTs as a reference point Stp which serves as a reference for the position of the initial shape MTs, and arranging the reference point Stp on one of points in the finger image including the detection target (nail contour).

In this embodiment, the detection information generation section 812 sets, among the feature points Trp constituting the initial shape MTs, the feature point Trp located closest to the nail tip in an extending direction of the nail T (Y direction in FIG. 3A to FIG. 5, etc.) as the reference point Stp.

The detection information generation section 812 also performs feature extraction of extracting, from each learning data, a feature amount useful in detecting the contour of the nail T. Examples of the feature amount include a brightness value of each pixel, a color of each pixel, a change amount in brightness value between adjacent pixels, and a change amount in color between adjacent pixels.

The detection information generation section 812 stores, as the contour detection information, coordinate values of the feature points Urp constituting the right finger contour Urs of the finger U2 in the model data, coordinate values of the feature points Trp constituting the initial shape MTs, information on the reference point Stp, information on the feature amount, and so forth in the contour detection information storage region 822 of the storage 82.

Figure 5:
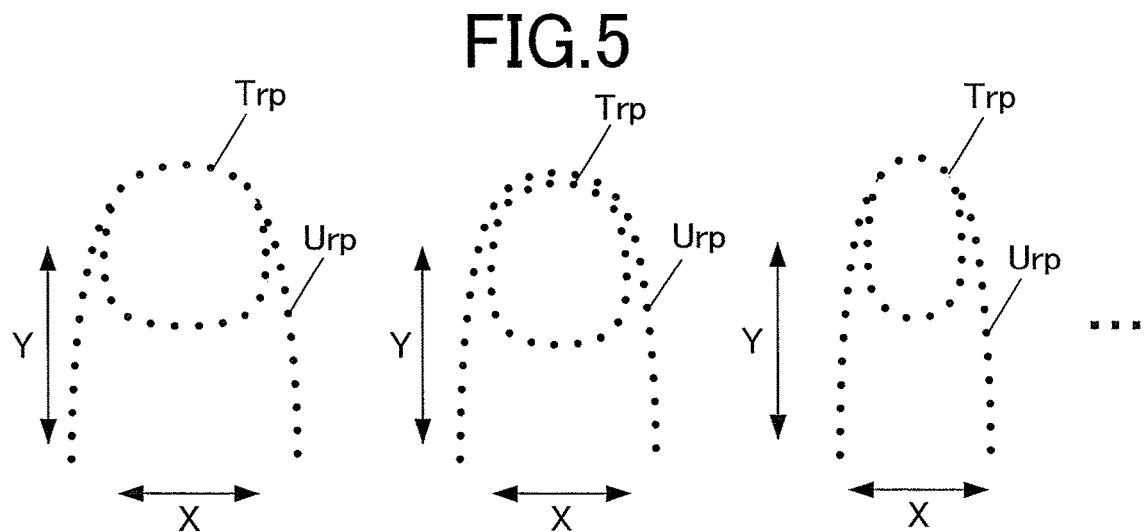
FIG. 5 shows examples of feature points of the right nail contour and feature points of the right finger contour shown in FIG. 4.

In learning to obtain the contour detection information, the detection information generation section 812 obtains, from each finger image Ig (shown in FIG. 4) including the nail contour Trs of the learning target nail GT, which is the detection target, the feature points Urp constituting the right finger contour Urs as shown in FIG. 5; arranges the initial shape MTs such that the reference point Stp of the initial shape MTs is located on, among the feature points Urp, the feature point Urp closest to the nail tip (apex Utp of the finger contour) in the extending direction of the nail T (Y direction in FIG. 3A to FIG. 5, etc.); and determines that this is the initial position of the initial shape MTs.

In the learning, the detection information generation section 812 arranges the initial shape MTs in the finger image Ig of the finger U2 in the learning data, and repeatedly moves coordinates of the feature points Trp constituting the initial shape MTs, referring to the feature amount or the like. The detection information generation section 812 thus gradually fits the initial shape MTs to the nail contour Trs of the learning target nail GT, which is the detection target.

Learning by repeating the above using the plurality of the learning data gradually improves detection accuracy of the contour detection information, which includes the parameters (classifier, etc.) for fitting the initial shape MTs to the nail contour Trs. The contour detection information stored in the contour detection information storage region 822 is always updated by reflecting the learning result.

The contour detection section 813 applies the contour detection information generated by the detection information generation section 812 to the data of the image (image It shown in FIG. 7, FIG. 8 and FIG. 10) of the finger U1 including the treatment target nail ST as the treatment target data, thereby detecting the nail contour Ts of the treatment target nail ST, which is the detection target.

In this embodiment, the contour detection section 813 detects the nail contour Ts of the treatment target nail ST by an algorism called explicit shape regression (ESR), for example.

ESR fits the initial shape MTs to the nail contour Ts of the treatment target nail ST, and as described in the abovementioned non-patent document, at the time of the fitting, uses a two-levels weak regressor (weak classifier) in combination to perform the contour detection as the regression problem that the initial shape MTs is gradually converged to the nail contour Ts, which is the right position, of the treatment target nail ST.

Figure 8:
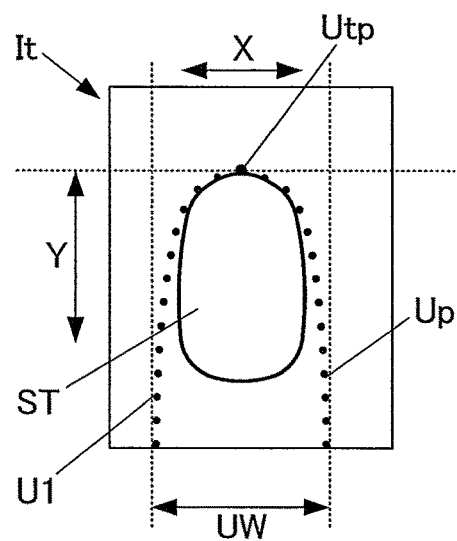
FIG. 8 shows an example of feature points and an apex of a finger contour of the finger including the treatment target nail in the image shown in FIG. 7.

More specifically, to detect the nail contour Ts of the treatment target nail ST, which is the detection target, as shown in FIG. 7 and FIG. 8, the contour detection section 813 first obtains the finger contour Us of the finger U1 in the treatment target data. Any method can be used as the method for obtaining the finger contour Us. Examples thereof include: as shown in FIG. 3A and FIG. 3B, a method of, with a finger-with-background image and the background image Ib of the background only prepared, subtracting the background image Ib of the background only from the finger-with-background image, thereby generating a difference image; a method of imaging the finger U1 on the background which is clearly different from the finger U1 in brightness or color, such as the background in solid black, and extracting the skin color part, namely, the part having a high brightness value (s), as the finger region; and a method of masking the background part, thereby extracting the finger region.

Figure 9:
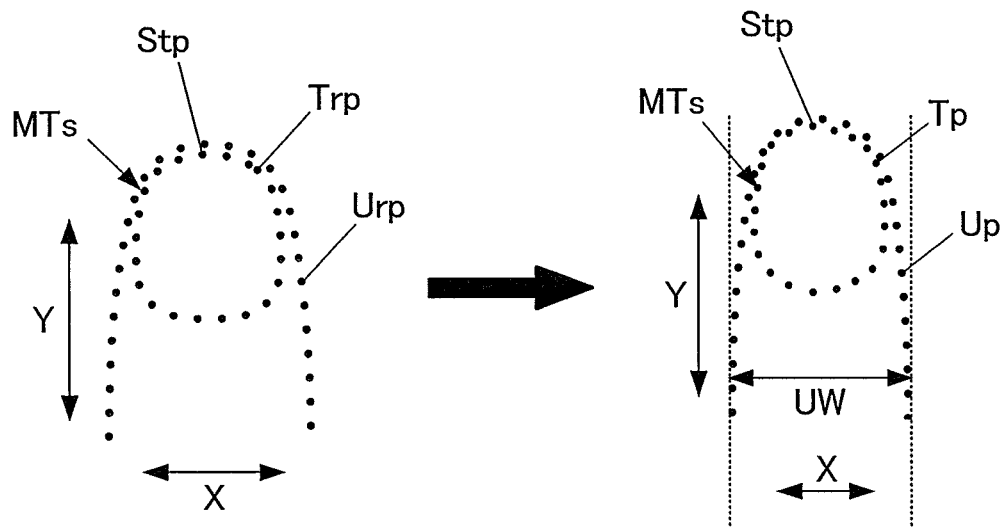
FIG. 9 is a diagram showing an example of scaling a nail contour and a finger contour in model data.
Figure 10:
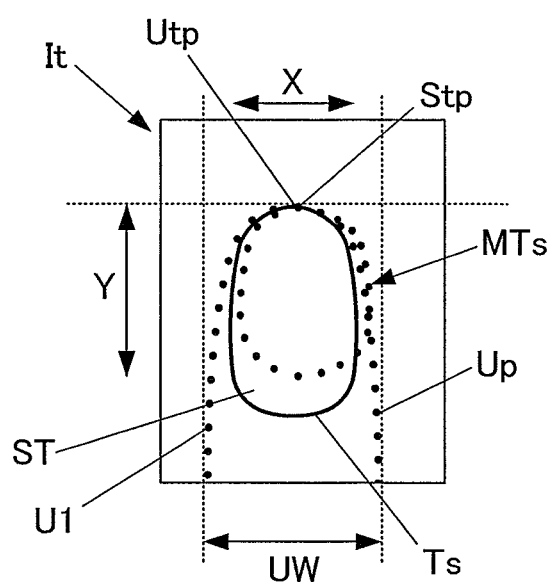
FIG. 10 shows an example of arrangement of the initial shape at an initial position.

The contour detection section 813 then detects the size of the finger U1 in a finger width direction UW from the finger contour Us. Then, as shown in FIG. 9, the contour detection section 813 scales the size of the finger contour (finger contour constituted of the feature points Urp) in the model data to fit the size of the finger U1.

The above, accordingly, scales the size of the initial shape MTs included in the finger U2 in the model data to fit the size of the finger U1.

When completing the adjustment of the size of the finger contour (initial shape MTs included in the finger contour) in the model data to the size of the finger U1, the contour detection section 813 determines the initial position of the initial shape MTs by arranging the reference point Stp of the initial shape MTs set by the detection information generation section 812 on one of points of the finger U1 on the finger tip side in the treatment target data.

In this embodiment, the contour detection section 813 obtains, from the finger image of the finger U1 in the treatment target data, feature points Up constituting the finger contour Us; arranges the initial shape MTs such that the reference point Stp of the initial shape MTs is located on, among the feature points Up, the feature point Utp closest to the nail tip in the extending direction of the nail T (Y direction in FIG. 8, FIG. 10, etc.); and determines that this is the initial position of the initial shape MTs.

When determining the initial position of the initial shape MTs, the contour detection section 813 fits the initial shape MTs to the treatment target nail ST from the initial position. More specifically, the contour detection section 813 arranges the initial shape MTs such that the reference point Stp is superposed on the feature point Utp of the finger U1 in the image It of the treatment target data, and repeatedly moves coordinates of the feature points Trp constituting the initial shape MTs, referring to the feature amount or the like. The contour detection section 813 thus gradually fits the initial shape MTs to the nail contour Ts of the treatment target nail ST, which is the detection target, thereby detecting the nail contour Ts of the treatment target nail ST.

Next, a contour detection information generation process and a contour detection process by the contour detection apparatus 1 of this embodiment will be described with reference to FIG. 11 and FIG. 12.

Figure 11:
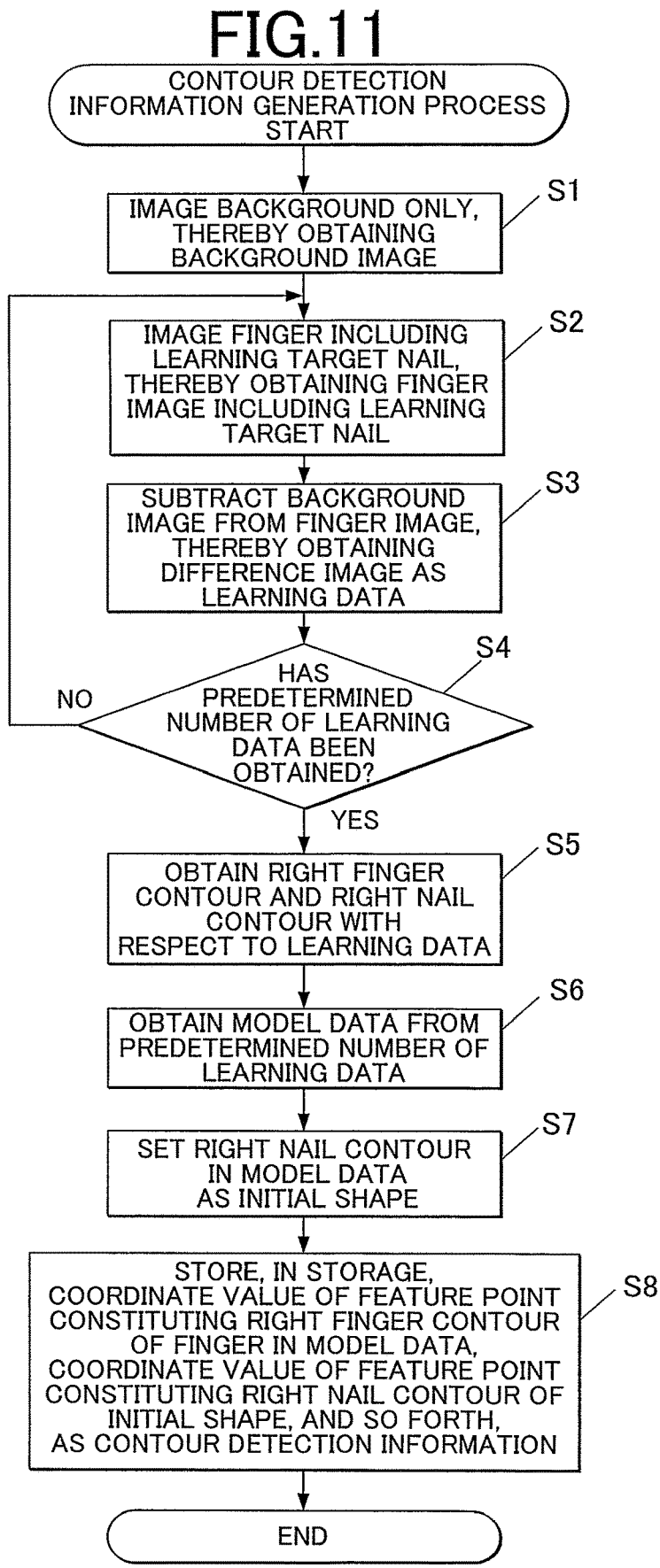
FIG. 11 is a flowchart showing a contour detection information generation process according to the embodiment.

In the contour detection information generation process, as shown in FIG. 11, first, the imaging unit 50 images the background only, thereby obtaining the background image Ib (shown in FIG. 3B) (Step S1). Next, the imaging unit 50 images the finger U2 including the learning target nail GT, thereby obtaining the finger-with-background image Igb including the learning target nail GT (shown in FIG. 3A) (Step S2). Next, the detection information generation section 812 subtracts the background image Ib from the finger-with-background image Igb, thereby obtaining the image Ig (difference image shown in FIG. 4) as the learning data (Step S3).

Next, the detection information generation section 812 determines whether or not a predetermined number of the learning data, which are the data of the images Ig of the fingers U2 including the learning targets (nail contours, in this embodiment), has been obtained (Step S4). When determining that the predetermined number of the learning data has not been obtained yet (Step S4; NO), the detection information generation section 812 brings the process back to Step S2 so that Step S2 and the following step (s) are repeated.

On the other hand, when determining that the predetermined number of the learning data has been obtained (Step S4; YES), the detection information generation section 812 obtains the right finger contour Urs and the right nail contour Trs from each learning data (Step S5). Next, the detection information generation section 812 obtains the model data from the predetermined number of the learning data (step S6), and sets the right nail contour Trs in the model data as the initial shape MTs (Step S7).

Next, the detection information generation section 812 stores, in the contour detection information storage region 822 of the storage 82, coordinate values of the right finger contour Urs in the model data, coordinate values of the right nail contour Trs of the initial shape MTs and other various parameters as the contour detection information (Step S8).

When setting the initial shape MTs, the detection information generation section 812 applies this initial shape MTs to each learning data, thereby detecting the nail contour Trs of the learning target nail GT included in the learning data.

More specifically, as with the contour detection process (shown in FIG. 12) described next, the detection information generation section 812 obtains the finger width UW of the right finger contour Urs of the finger U2 in each image Ig, and also obtains the finger width UW of the right finger contour Urs of the finger U2 in the model data, and scales the size of the finger U2 (finger contour Urs including the initial shape MTs, which is the nail contour Trs) in the model data such that the finger width UW of the finger U2 in the model data fits the size of the finger U2 including the learning target nail GT. Thus, the initial shape MTs is made to have the same/similar size as/to the learning target nail GT, thereby being easily fitted to (the nail contour Trs of) the learning target nail GT.

Next, the detection information generation section 812 sets, as the initial position, a position which puts the reference point Stp of the initial shape MTs on the apex of the right finger contour Urs of the finger U2 on the nail tip side (i.e. the nail tip side in the extending direction of the finger U2, the extending direction intersecting at right angles to the finger width UW of the finger U2), and arranges the initial shape MTs at the initial position. Then, the detection information generation section 812 gradually fits the initial shape MTs to the nail contour Trs of the finger U2, thereby detecting the nail contour Trs of the learning target nail GT (the contour of the nail region). Learning by repeating the process of detecting the nail contour Trs of the learning target nail GT increases detection accuracy of the contour detection information, which includes the aforementioned parameters, used in the contour detection. The detection information generation section 812 stores, as needed, the contour detection information updated by the learning in the contour detection information storage region 822, thereby updating its contents.

Figure 12:
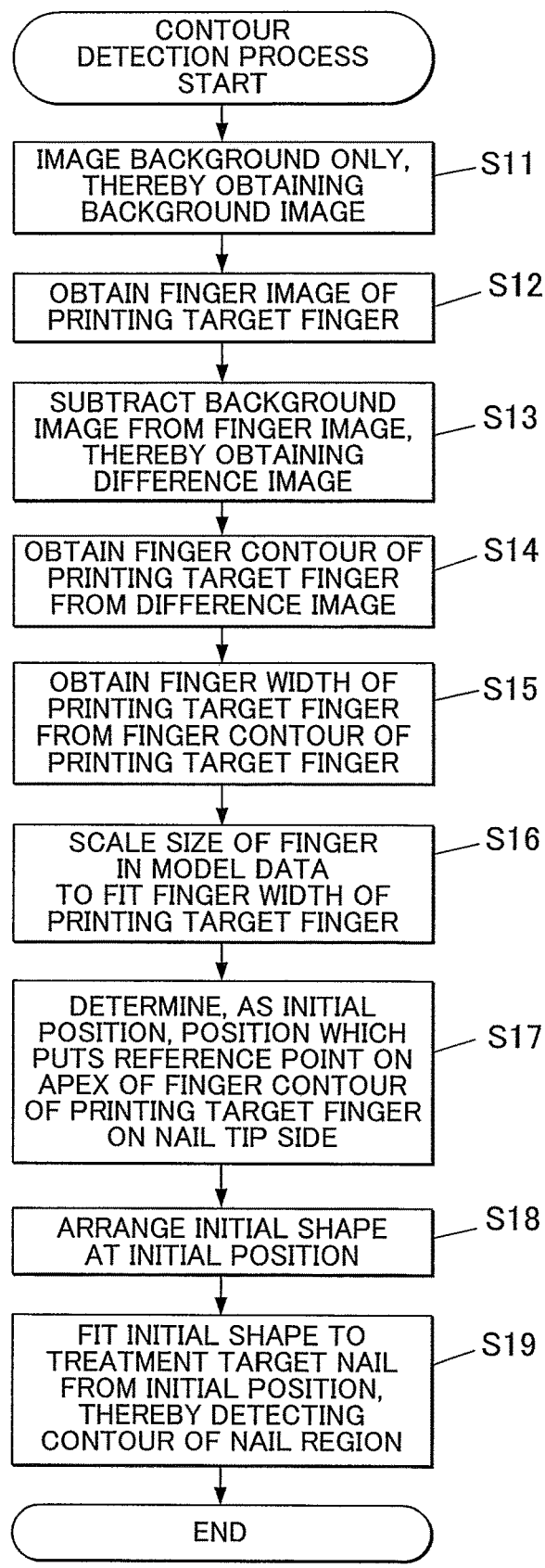
FIG. 12 is a flowchart showing a contour detection process according to the embodiment.

Next, in the contour detection process, as shown in FIG. 12, first, the imaging unit 50 images the background only, thereby obtaining the background image Ib (Step S11). If the background image Ib is already obtained, for example, because the learning target nails GT and the treatment target nail ST are imaged by the same imaging unit 50, Step S11 can be skipped.

Next, the imaging unit 50 images the finger U1 including the treatment target nail ST, thereby obtaining the finger image (i.e. the finger-with-background image) of the finger U1 including the treatment target nail ST (Step S12). Next, the contour detection section 813 subtracts the background image Ib from the finger image, thereby obtaining the image It (difference image shown in FIG. 7 and FIG. 10) as the treatment target data (Step S13).

When obtaining the image It (difference image), the contour detection section 813 obtains the finger contour Us of the finger U1 from the image It (Step S14), and also obtains the finger width UW of the finger U1 from the finger contour Us of the finger U1 (Step S15). When obtaining the finger width UW of the finger U1, the contour detection section 813 scales the size of the finger U2 (the finger contour Urs including the initial shape MTs, which is the nail contour Trs) in the model data to fit the finger width UW of the finger U1 (Step S16). Thus, the initial shape MTs is made to have the same/similar size as/to the treatment target nail ST, thereby being easily fitted to (the nail contour Ts of) the treatment target nail ST.

The initial shape MTs used at the time of the learning and the initial shape MTs used at the time of the detection of the nail contour Ts of the treatment target nail ST are the same.

When completing the size adjustment, the contour detection section 813 sets, as the initial position, a position which puts the reference point Stp of the initial shape MTs on the apex Utp (shown in FIG. 10) of the finger contour Us of the finger U1 on the nail tip side (Step S17), and arranges the initial shape MTs at the initial position (Step S18).

Then, the contour detection section 813 gradually fits the initial shape MTs to the nail contour Ts of the finger U1, thereby detecting the nail contour Ts of the treatment target nail ST (the contour of the nail region) (Step S19).

The contour detection section 813 stores the detection result adopted as the contour of the nail T (coordinate values of points constituting the contour) in the end in the contour information storage region 823 as the contour of the user's nail T, which is the detection target.

The nail contour Ts of the treatment target nail ST detected by the contour detection apparatus 1 of this embodiment is set as a drawing region for nail printing on the nail T with a drawing apparatus, for example.

The nail contour Ts of the treatment target nail ST as the detection result can be a target region for any type of nail care. Examples of the nail care include: the aforementioned nail printing; and automatic nail polishing which automatically smooths the surface of the treatment target nail ST.

As described above, according to this embodiment, if the contour detection information, which is used to detect the nail contour Ts, is obtained by learning and applied to the data of the image It of the finger U1 including the treatment target nail ST as the treatment target data to detect the nail contour Ts of the treatment target nail ST, (i) model data is extracted from a plurality of learning data, (ii) the right nail contour Trs in the model data is set as the initial shape MTs, and (iii) one of the feature points Trp of the initial shape MTs is set as the reference point Stp, and at the time of detection of the nail contour Ts of the treatment target nail ST, (i) the initial position of the initial shape MTs is determined by arranging the reference point Stp of the finger U1 on the finger tip side, and (ii) the initial shape MTs is fitted to the treatment target nail ST from the initial position. Thus, the nail contour Ts of the treatment target nail ST is detected.

In the case of the contour detection by the fitting, the initial position where the initial shape MTs is arranged affects the detection accuracy. Hence, it is preferable to set the initial position as close as possible to the detection target (nail contour, in this embodiment). The nail contour Ts as the detection target is located on the finger tip side. In this embodiment, the initial shape MTs used in the learning is used to detect the nail contour Ts of the treatment target nail ST, and the initial position is set at the position which puts the reference point Stp, which is the apex of the initial shape MTs on the nail tip side, on the apex Utp of the finger U1 on the nail tip side (the feature point Up on the tip in the length direction Y which intersects at right angles to the finger width direction UW of the finger contour Us).

This improves detection accuracy of the nail contour Ts because the initial shape MTs is initially arranged in the vicinity of the nail contour Ts without exception.

In order to improve accuracy of the contour detection information, it is necessary to obtain learning data which are for generating the contour detection information as many as possible. Although data to be used may be obtained under various conditions, because, in this embodiment, the fitting is performed with the apexes matched (superposed) as described above, even if the learning data and the treatment target data are obtained under different imaging conditions (i.e. under different imaging environments), the initial shape MTs can be arranged at an appropriate position, and highly accurate contour detection can be performed stably.

Further, because learning (machine learning) is used to detect the nail contour Ts of the treatment target nail ST, the target region for nail printing or the like can be correctly detected without giving a user much trouble.

It is usually difficult to distinguish nails from fingers in learning (machine learning) or the like with no limitation imposed because nails and skin (finger parts) around the nails are little different from one another in brightness or color. Then, in this embodiment, first, the finger part (s) which is relatively different from its surroundings in brightness or color and accordingly can be easily detected automatically, is detected, and then the nail contour is detected automatically by making use of learning (machine learning) or the like.

This enables automatic contour detection, which does not give a user much trouble, with high accuracy.

Further, in this embodiment, the size of the finger U2 including the learning target nail GT in the model data is scaled according to size information on the finger U1 in the treatment target data, the size information being obtained from the finger contour Us.

This enables the fitting process to be performed after the size of the initial shape MTs and the size of the nail contour of the learning target nail GT are made to be the same or similar, and accordingly enables correct contour detection more promptly.

Further, in this embodiment, from the learning data, the no-background images Ig of the right finger contours Urs without the background are generated, and learning is performed using the no-background images Ig.

This eliminates a possibility of decrease in detection accuracy of the finger contour (s) caused by the background, and enables more highly accurate contour detection to be performed stably.

Further, in this embodiment, as the size information on the finger U1, the dimension in the finger width direction UW of the finger contour Us is used.

This enables easy detection of the size of the finger U1 (finger contour Us).

Further, in this embodiment, because automatic highly accurate contour detection can be performed, even if the detection target is the nail T which, unlike a face or the like, does not have a part that serves as a clear landmark, correct contour detection can be performed.

Second Embodiment

Next, a case where the contour detection apparatus of the present invention is applied to a drawing apparatus which draws nail designs on nails (hereinafter "nail printer") will be described as a second embodiment with reference to FIG. 13 and FIG. 14.

Configuration and actions/effects of the contour detection apparatus in the second embodiment are the same as those in the first embodiment. Hence, hereinafter, respects different from the first embodiment will be described, in particular.

Figure 13:
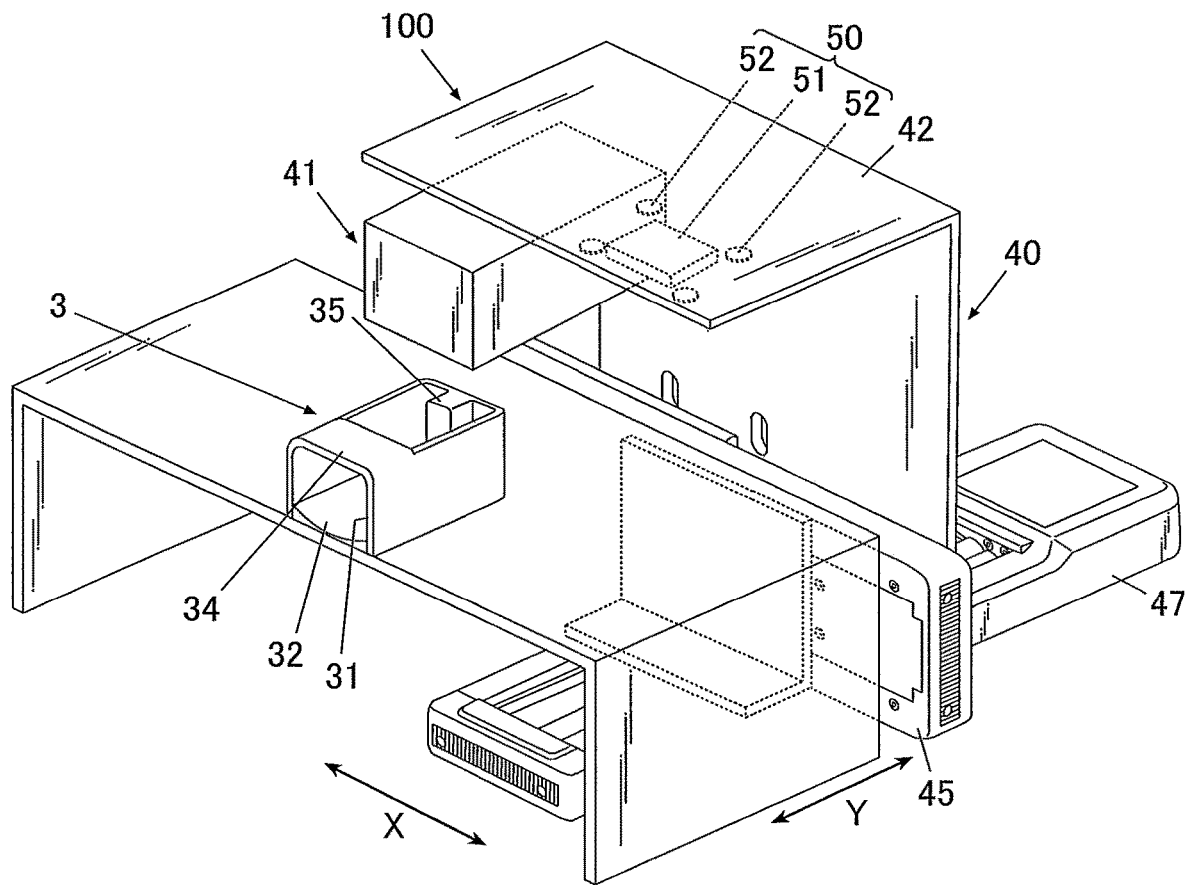
FIG. 13 is a perspective view showing internal components of a nail printer according to an embodiment (s)
Figure 14:
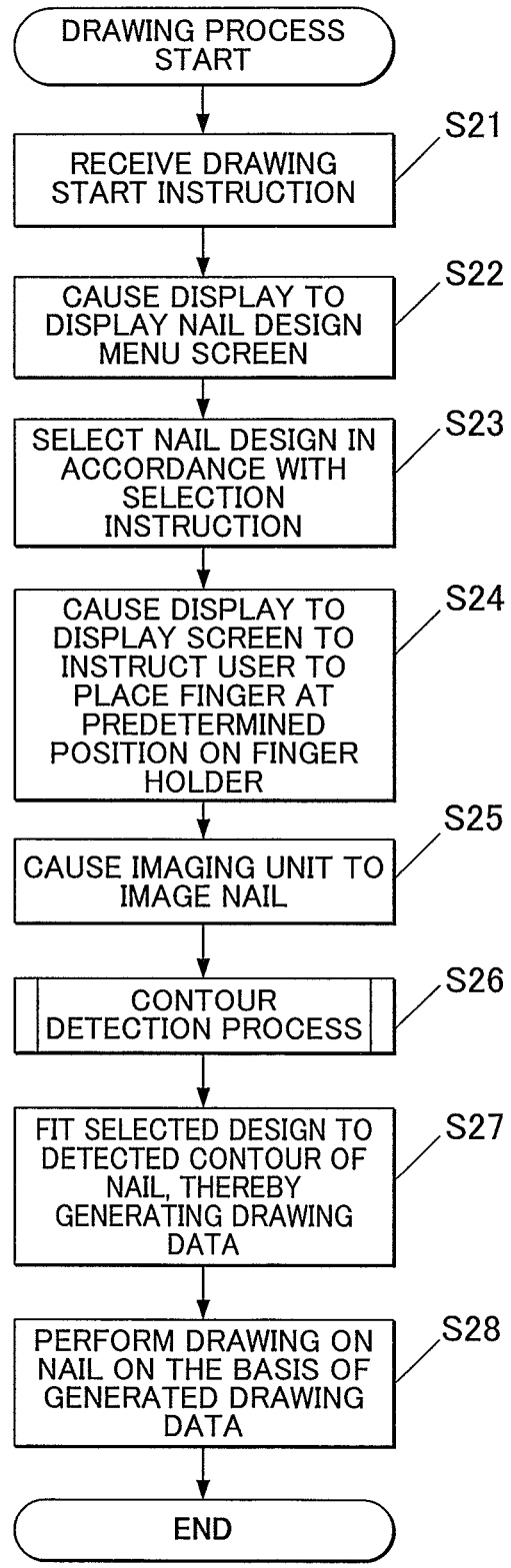
FIG. 14 is a flowchart showing a drawing process according to the embodiment.

FIG. 13 is a perspective view schematically showing configuration of a nail printer 100 to which the contour detection apparatus 1 is applied, as an example.

Although FIG. 13 does not show them, the nail printer 100 is configured such that the internal components shown in FIG. 2 are housed, for example, in the case 11 provided with the operation unit 12, the display 13 and so forth shown in FIG. 1.

As shown in FIG. 13, the nail printer 100 includes a drawing unit 40 in addition to the components shown in FIG. 1 and FIG. 2.

The drawing unit 40 includes: a drawing head 41 as the main body of the drawing unit 40; a unit supporting member 42; an X-direction moving stage 45 which moves the unit supporting member 42 in X direction (X direction in FIG. 13, etc. or the right-left direction of the nail printer 100); a not-shown X-direction movement motor; a Y-direction moving stage 47 which moves the unit supporting member 42 in Y direction (Y direction in FIG. 13, etc. or the front-back direction of the nail printer 100); and a not-shown Y-direction movement motor.

The drawing head 41 of this embodiment is an inkjet head, which performs drawing by an inkjet method. The drawing head 41 is not limited to the inkjet head, and may be a drawing head configured by including, for example, a pen the tip of which directly touches the surface of the treatment target nail ST to perform drawing.

FIG. 13 shows a case where the unit supporting member 42 supports the drawing head 41 and the imaging unit 50, and the X-direction movement motor, the Y-direction movement motor and so forth constitute a not-shown head moving mechanism which moves the drawing head 41 and the imaging unit 50 supported by the unit supporting member 42.

Having the head moving mechanism enables appropriate movement of the drawing head 41 and the imaging unit 50 such that the imaging unit 50 is arranged above the finger holder 3 at the time of imaging of the treatment target nail ST, and the drawing head 41 is arranged above the finger holder 3 at the time of drawing.

The drawing head 41, the X-direction movement motor and the Y-direction movement motor of the drawing unit 40 are connected to and controlled by a not-shown drawing control section of the control device 80.

In the nail printer 100, the contour detection section 813, shown in FIG. 2, of the contour detection apparatus 1 detects a wide range of nail information which includes, in addition to the contour of the treatment target nail ST (the nail shape, X and Y coordinates of the horizontal position of the treatment target nail ST, etc.), the height of the treatment target nail ST (the position of the treatment target nail ST in the vertical direction or the vertical position of the treatment target nail ST), and the angle of inclination of the surface of the treatment target nail ST with respect to an XY plane (the angle of inclination of the treatment target nail ST or the curvature of the treatment target nail ST).

The control device 80 of the nail printer 100 generates, on the basis of the nail information detected by the contour detection section 813, data to be drawn (hereinafter "drawing data) by the drawing head 41 on the treatment target nail ST, of the finger U1.

More specifically, the control device 80 performs the fitting process of fitting image data on a nail design to the shape of the nail T, for example, by enlarging, reducing or cutting out the image data on the basis of the contour shape or the like of the treatment target nail ST.

Further, the control device 80 performs, as needed, curved-surface correction or the like according to the nail information detected by the contour detection section 813.

Thus, the control device 80 generates the drawing data on the nail design to be drawn by the drawing head 41.

The drawing data generated by the control device 80 is output to the drawing unit 40, and the X-direction movement motor, the Y-direction movement motor, the drawing head 41 and so forth of the drawing unit 40 are controlled by the control device 80 such that the drawing unit 40 performs drawing on the nail T in accordance with the drawing data.

The storage 82 of the nail printer 100 has a nail design storage region where nail designs are stored, a finger image storage region where finger images are stored, and so forth, in addition to those, shown in FIG. 2, of the contour detection apparatus 1.

In the nail design storage region, image data on the nail designs to be drawn on the treatment target nail ST are stored.

The other components are the same as those in the first embodiment, and hence they are given the same reference numerals as those in the first embodiment, and descriptions thereof are not repeated here.

Next, a drawing process by the nail printer 100 of this embodiment will be described with reference to FIG. 14.

In this embodiment, to perform drawing on the nail T with the nail printer 100, a user turns on the power of the nail printer 100, and operates the operation unit 12, to be specific, a drawing start button or the like. Thus, a drawing start instruction corresponding to the operation is input to the control device 80 of the nail printer 100 (Step S21).

When receiving the drawing start instruction, the controller 81 causes the display 13 to display a nail design menu screen for nail design selection (Step S22) to urge the user to select a nail design.

When the user selects a desired nail design with the operation unit 12 or the like, the controller 81 selects a nail design to be drawn on the nail T in accordance with the selection instruction (Step S23).

When selecting the nail design, the controller 81 causes the display 13 to display an instruction screen to instruct the user to place a finger having a nail which is a drawing target at a predetermined position on the finger holder 3 (Step S24) to urge the user to settle the treatment target nail ST (and its finger U1).

The user inserts the finger U1 into the finger holder 3 in accordance with the instruction, and places the tip of the treatment target nail ST on the nail placement part 35, which is a positioning unit, so that the treatment target nail ST is fixedly positioned.

Next, in the state in which the treatment target nail ST is positioned by the nail placement part 35, the imaging control section 811 causes the imaging unit 50 to operate to image the treatment target nail ST (Step S25), thereby obtaining the treatment target data which is data of a treatment target image including the region of the treatment target nail ST, which is the treatment target.

When the treatment target data is obtained, the contour detection section 813 performs the contour detection process to detect the contour of the nail region in the image (Step S26). The contents of the contour detection process are the same as those in the first embodiment described with reference to FIG. 12, and hence descriptions thereof are not repeated here.

The contour detection section 813 of this embodiment detects, in addition to those detected by the contour detection in the first embodiment, the height of the treatment target nail ST (the position of the treatment target nail ST in the vertical direction or the vertical position of the treatment target nail ST), the angle of inclination of the surface of the treatment target nail ST with respect to an XY plane (the angle of inclination of the treatment target nail ST or the curvature of the treatment target nail ST), and so forth from the finger image (detection target image) It.

When the nail information, such as the contour of the treatment target nail ST, is detected, the control device 80 fits the selected nail design to the detected contour of the treatment target nail ST, and performs, as needed, correction, such as curved-surface correction, thereby generating the drawing data (drawing data on the nail design) (Step S27).

When generating the drawing data, the control device 80 outputs the drawing data to the drawing unit 40, and causes the head moving mechanism to operate to appropriately move the drawing head 41 such that the drawing head 41 performs drawing based on the drawing data. The drawing head 41 thus draws the nail design based on the drawing data on the nail T (Step S28).

The other respects are the same as those in the first embodiment, and hence descriptions thereof are not repeated here.

As described above, this embodiment can obtain the following effects in addition to the same effects as the first embodiment.

That is, in this embodiment, the nail printer 100 as the drawing apparatus includes the contour detection apparatus 1 described in the first embodiment, and hence can precisely identify, about the nail T (treatment target nail ST), which is a detection target difficult to detect the border or the like with the finger part, the nail region, which is a drawing area (i.e. the drawing region), without taking much time or giving a user much trouble, and can perform nail printing with a beautiful finish, for example, with no paint on the outside of the nail region.

In the above, some embodiments of the present invention have been described. Needless to say, however, the present invention is not limited to the embodiments, and can be modified in a variety of respects without departing from the scope of the present invention.

For example, in the above embodiments, the contour detection section 813 uses ESR to fit the initial shape MTs to the region of the detection target. However, the algorism usable by the contour detection section 813 to fit the initial shape MTs to the nail contour Ts of the treatment target nail ST is not limited to ESR.

If an algorism to be used is one which makes the arrangement position of the initial shape MTs in fitting the initial shape MTs to the region of the detection target somewhat affect the contour detection, it is preferable to use the method described in the above embodiments.

Hence, the above embodiments are also applicable, for example, to a case where the contour detection section 813 uses active appearance model (AAM), active shape model (ASM), active contour model (ACM) or the like as an algorism usable in fitting the initial shape MTs to the nail contour Ts of the treatment target nail ST.

Further, in the above embodiments, the apex of the initial shape MTs on the nail tip side is the reference point Stp of the initial shape MTs; the position which puts the reference point Stp on the apex Utp of the finger U1 on the nail tip side in the extending direction which intersects at right angles to the finger width direction UW of the finger contour Us is the initial position where the initial shape MTs is arranged; and the initial shape MTs and the finger contour Us are superposed on top of one another on the finger tip side. However, the initial position where the initial shape MTs is arranged is not limited thereto. For example, it is possible that the centroid of the finger contour in the model data and the centroid of the finger contour Us of the finger U1 are obtained, and a position which puts these centroids on top of one another is set as the initial position.

Further, in the above embodiments, in order to make the size of the initial shape MTs close to the size of the treatment target nail ST, the size of the finger U1 in the finger width direction UW of the finger contour Us is detected, and the size of the finger U2 in the finger width direction UW of the finger contour Urs in the model data is scaled to fit the size of the finger U1 in the finger width direction UW of the finger contour Us. However, size adjustment of the initial shape MTs is not limited to being based on the size in the finger width direction UW.

For example, the size adjustment may be performed such that the finger contour UrS in the model data fits the finger contour Us of the finger U1 in terms of the dimension in the finger extending direction.

Further, in the above embodiments, the nail T is the detection target. However, the detection target, the contour of which can be detected by the contour detection apparatus, is not limited to the nail T.

For example, the detection target, the contour of which can be detected, may be a face or a facial part, such as an eye, a nose or a mouth.

To detect the contour of a face or a facial part, for example, a chin placement stand or the like for fixing the position of a chin may be installed as the positioning unit, and imaging is performed in a state in which a chin is fixedly placed on the chin placement stand, thereby generating a learning target image or a detection target image.

Further, in the second embodiment, the nail printer 100 which performs drawing on the nail (s) T is the drawing apparatus. However, the drawing apparatus is not limited to the nail printer 100, and may be one which performs drawing on something other than the nail T. If the drawing target is something other than the nail T, a contour detection apparatus which detects a contour defining the region of that drawing target is applied to the drawing apparatus.

Further, in the case where the contour detection apparatus 1 is one which detects the contour of the nail T, in the second embodiment, after the contour of the nail T is detected, drawing is performed in the region enclosed by the detected contour. However, the treatment performed after the contour detection is not limited to the drawing process. Examples of the after-treatment include automatic nail polishing which automatically smooths the surface of the nail T, and automatic nail care.

Further, if the detection target is an organ or the like included (captured) in a medical image obtained by a medical imaging apparatus, as the treatment performed after the contour detection, a doctor or the like may perform image diagnosis or provide a patient with information on his/her health condition, for example.

In the above, some embodiments of the present invention have been described. However, the scope of the present invention is not limited thereto, and includes the scope of claims below and the scope of their equivalents.

What is claimed is:
1. A contour detection apparatus comprising:
 a finger holder which holds and fixes a finger including a treatment target nail;
 an imaging unit which images, from a predetermined position, the finger held and fixed by the finger holder;
 a physical treatment unit which performs a physical treatment on the treatment target nail of the finger held and fixed by the finger holder; and
 a processor which:
  obtains contour detection information generated by learning to detect a nail contour which is a detection target, wherein the learning is performed by setting an initial shape including a plurality of feature points based on a plurality of learning data each of which is image data on a finger including a learning target nail, and setting, as a reference point, a feature point among the feature points corresponding to a reference position;
  obtains, as treatment target data, image data on the finger including the treatment target nail generated by the imaging unit imaging the finger;
  arranges, in the treatment target data, an initial position of the initial shape such that a point corresponding to the reference position in a finger contour of the finger including the treatment target nail is superposed on the reference point in the contour detection information, and fits the initial shape to the treatment target nail from the initial position, thereby detecting a nail contour of the treatment target nail; and
  controls, based on the detected nail contour of the treatment target nail, the physical treatment which is performed by the physical treatment unit on the treatment target nail.

2. The contour detection apparatus according to claim 1, wherein the processor:
 obtains, from each of the plurality of the learning data, (i) a right finger contour defining a region of the finger and including a plurality of feature points and (ii) a right nail contour defining a region of the learning target nail and including a plurality of feature points;
 extracts model data from the plurality of the learning data; and
 sets the right nail contour in the model data as the initial shape.

3. The contour detection apparatus according to claim 2, wherein the processor:
 obtains, from the treatment target data, a finger contour defining a region of the finger and including a plurality of feature points; and
 scales a size of the finger including the learning target nail in the model data according to size information on the finger in the treatment target data, the size information being obtained from the finger contour.

4. The contour detection apparatus according to claim 1, wherein the processor arranges the initial shape such that the reference point is located on, among the feature points of the finger contour, a feature point on a finger tip side, thereby determining the initial position of the initial shape.

5. The contour detection apparatus according to claim 2, wherein:
 a no-background image of the right finger contour without a background is generated from each of the plurality of the learning data; and
 the learning is performed using the no-background image.

6. The contour detection apparatus according to claim 1, wherein:
 the feature point among the feature points of the initial shape is set as the reference point which serves as a reference for a position of the initial shape, and the reference point is arranged on a point among points of the finger on a finger tip side in each of the plurality of the learning data, thereby setting the initial position of the initial shape; and
 the learning is performed by fitting fits the initial shape, the reference point of which is arranged on the point on the finger tip side, to the learning target nail from the initial position, and detecting the nail contour of the learning target nail.

7. The contour detection apparatus according to claim 3, wherein the size information on the finger is a dimension in a finger width direction.

8. The contour detection apparatus according to claim 1, wherein the point in the finger contour superposed on the reference point is a feature point at a tip in a length direction which intersects at right angles to a finger width direction of the finger contour.

9. The contour detection apparatus according to claim 1, wherein the physical treatment unit comprises a printing head which performs printing in a region enclosed by the detected nail contour.

10. A contour detection method that is performed by an apparatus including a finger holder which holds and fixes a finger including a treatment target nail, an imaging unit which images, from a predetermined position, the finger held and fixed by the finger holder, a physical treatment unit which performs a physical treatment on the treatment target nail of the finger held and fixed by the finger holder, and a processor, the method comprising:
- a detection information obtaining step of obtaining, by the processor, contour detection information generated by learning to detect a nail contour which is a detection target, wherein the learning is performed by setting an initial shape including a plurality of feature points based on a plurality of learning data each of which is image data on a finger including a learning target nail, and setting, as a reference point, a feature point among the feature points corresponding to a reference position;
- an imaging step of imaging, by the imaging unit, from the predetermined position, the finger including the treatment target nail held and fixed by the finger holder, to obtain image data on the finger as treatment target data;
- a contour detection step of arranging, by the processor, in the treatment target data, an initial position of the initial shape such that a point corresponding to the reference position in a finger contour of the finger including the treatment target nail is superposed on the reference point in the contour detection information, and fitting the initial shape to the treatment target nail from the initial position, thereby detecting a nail contour of the treatment target nail; and
- a physical treatment step of performing, by the physical treatment unit, a physical treatment on the treatment target nail of the finger held and fixed by the finger holder, based on the detected nail contour of the treatment target nail.

11. A non-transitory computer readable storage medium storing a program that is executable by a computer of a contour detection apparatus including (i) a finger holder which holds and fixes a finger including a treatment target nail, (ii) an imaging unit which images, from a predetermined position, the finger held and fixed by the finger holder, and (iii) a physical treatment unit which performs a physical treatment on the treatment target nail of the finger held and fixed by the finger holder, the program being executable by the computer to cause the computer to perform functions comprising:
- a detection information obtaining function which obtains contour detection information generated by learning to detect a nail contour which is a detection target, wherein the learning is performed by setting an initial shape including a plurality of feature points based on a plurality of learning data each of which is image data on a finger including a learning target nail, and setting, as a reference point, a feature point among the feature points corresponding to a reference position;
- an imaging function which controls the imaging unit to image, from the predetermined position, the finger including the treatment target nail held and fixed by the finger holder to obtain image data on the finger as treatment target data;
- a contour detection function which arranges, in the treatment target data, an initial position of the initial shape such that a point corresponding to the reference position in a finger contour of the finger including the treatment target nail is superposed on the reference point in the contour detection information, and fits the initial shape to the treatment target nail from the initial position, thereby detecting a nail contour of the treatment target nail; and
- a physical treatment function which controls the physical treatment unit to perform the physical treatment on the treatment target nail of the finger held and fixed by the finger holder, based on the detected nail contour of the treatment target nail.

12. The contour detection apparatus according to claim 1, wherein the processor performs the learning and obtains the contour detection information.

13. The contour detection apparatus according to claim 1, wherein the physical treatment unit performs, based on the detected nail contour, printing on the treatment target nail of the finger held and fixed by the finger holder.

14. The contour detection apparatus according to claim 13, wherein the physical treatment unit includes:
- a drawing head that performs the printing on the treatment target nail;
- a unit supporting member that supports the drawing head and the imaging unit; and
- a moving stage that moves the unit supporting member such that the imaging unit is arranged above the finger holder at a time of the imaging of the treatment target nail, and the drawing head is arranged above the finger holder at a time of the printing on the treatment target nail.

15. The contour detection apparatus according to claim 5, wherein the processor:
- generates, from each of the plurality of the learning data, the no-background image of the right finger contour without the background; and
- performs the learning using the no-background image.

16. The contour detection apparatus according to claim 6, wherein the processor:
- sets the feature point among the feature points of the initial shape as the reference point which serves as the reference for the position of the initial shape, and arranges the reference point on the point among points of the finger on the finger tip side in each of the plurality of the learning data, thereby setting the initial position of the initial shape; and
- fits the initial shape, the reference point of which is arranged on the point on the finger tip side, to the learning target nail from the initial position, and detects the nail contour of the learning target nail, thereby performing the learning.

* * * * *

UNITED STATES PATENT AND TRADEMARK OFFICE
CERTIFICATE OF CORRECTION

PATENT NO. : 10,945,506 B2
APPLICATION NO. : 16/224668
DATED : March 16, 2021
INVENTOR(S) : Masaaki Sasaki Page 1 of 1

It is certified that error appears in the above-identified patent and that said Letters Patent is hereby corrected as shown below:

In the Claims

Column 18, Line 66 (Claim 6, Line 10), after "fitting" delete "fits".

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*